US011454255B2

(12) United States Patent
Johst et al.

(10) Patent No.: US 11,454,255 B2
(45) Date of Patent: Sep. 27, 2022

(54) SYSTEM FOR SUPPLYING HYDRAULIC PRESSURE TO A BOLT ELONGATION TOOL

(71) Applicant: ADMEDE AB, Malmö (SE)

(72) Inventors: Kenneth Johst, Frederiksberg C (DK); Lars Jagd, Malmö (SE); Gerald Marinitsch, Kalsdorf (AT)

(73) Assignee: ADMEDE AB, Malmö (SE)

( * ) Notice: Subject to any disclaimer, the term of this patent is extended or adjusted under 35 U.S.C. 154(b) by 897 days.

(21) Appl. No.: 16/078,215

(22) PCT Filed: Jan. 27, 2017

(86) PCT No.: PCT/EP2017/051767
§ 371 (c)(1),
(2) Date: Aug. 21, 2018

(87) PCT Pub. No.: WO2017/144232
PCT Pub. Date: Aug. 31, 2017

(65) Prior Publication Data
US 2021/0246918 A1     Aug. 12, 2021

(30) Foreign Application Priority Data
Feb. 24, 2016   (EP) ..................................... 16157082

(51) Int. Cl.
F15B 7/00       (2006.01)
(52) U.S. Cl.
CPC .................................. F15B 7/005 (2013.01)
(58) Field of Classification Search
CPC ................................ F15B 7/005; B25B 29/02
See application file for complete search history.

(56) References Cited

U.S. PATENT DOCUMENTS 1,988,480 A * 1/1935 Campkin ................ A61M 5/20
                                                 604/155
3,824,905 A * 7/1974 Jablonsky ................ B62D 5/24
                                                 92/136
(Continued)

FOREIGN PATENT DOCUMENTS

DE    102005015922 A1   10/2006
DE    102009040126 A1    3/2011
(Continued)

OTHER PUBLICATIONS

Search Report of PCT/EP2017/051767 dated Mar. 29, 2017.
International Preliminary Report on Patentability of PCT/EP2017/051767 dated Aug. 28, 2018.

Primary Examiner — Michael Leslie
Assistant Examiner — Matthew Wiblin
(74) Attorney, Agent, or Firm — Workman Nydegger

(57) ABSTRACT

System for supplying hydraulic pressure to a bolt elongation tool, comprising the bolt elongation tool with at least one pressure chamber and a tool piston, a hydraulic medium supply system and a hydraulic actuator with an actuator cylinder housing an actuator piston. The actuator cylinder is attached to the at least one pressure chamber, wherein the hydraulic actuator is an electro-hydraulic actuator comprising an electric motor built to generate the power of the electro-hydraulic actuator, and wherein the actuator piston is built to supply, with one stroke of an actuator stroke height of the actuator piston, at least the amount of hydraulic pressure that is needed to move the tool piston for the amount of one tool stroke height of the tool piston.

20 Claims, 5 Drawing Sheets

(56) References Cited

U.S. PATENT DOCUMENTS

| | | | | |
|---|---|---|---|---|
| 4,089,624 A | * | 5/1978 | Nichols | B01L 3/0206 |
| | | | | 417/362 |
| 4,150,477 A | * | 4/1979 | Orr | B25B 27/16 |
| | | | | 29/525.08 |
| 4,523,742 A | * | 6/1985 | Reneau | F16B 21/16 |
| | | | | 81/57.38 |
| 5,655,371 A | | 8/1997 | Chuang | |
| 6,817,859 B2 | * | 11/2004 | Dantlgraber | B22D 17/26 |
| | | | | 264/328.1 |

FOREIGN PATENT DOCUMENTS

| | | |
|---|---|---|
| DE | 102014107139 A1 | 11/2015 |
| EP | 3210717 | 8/2017 |
| GB | 1 550 560 A | 8/1979 |
| WO | WO 00/32932 A1 | 6/2000 |
| WO | WO 2017/144232 A1 | 1/2017 |

* cited by examiner

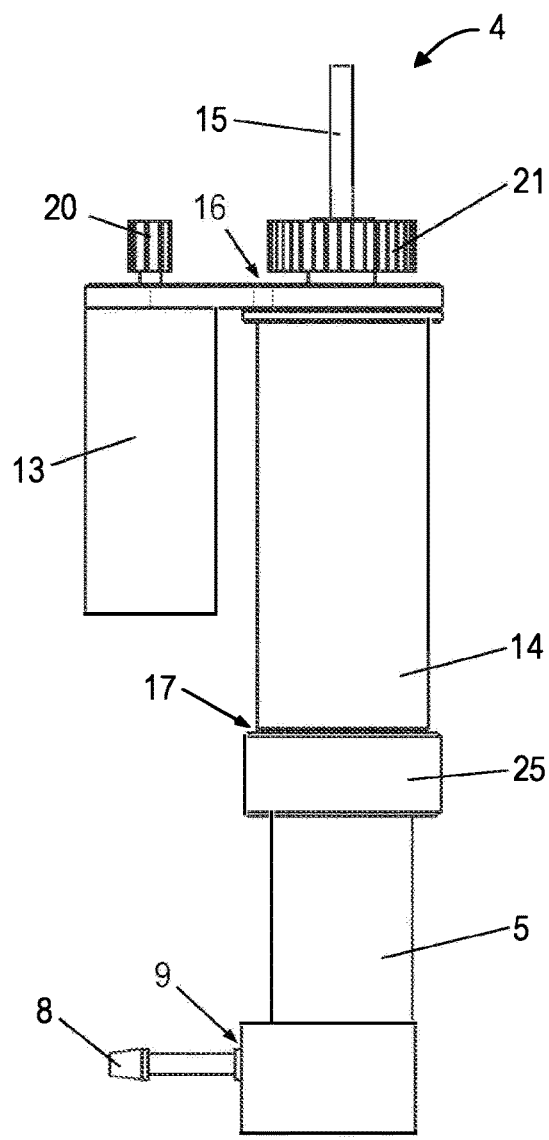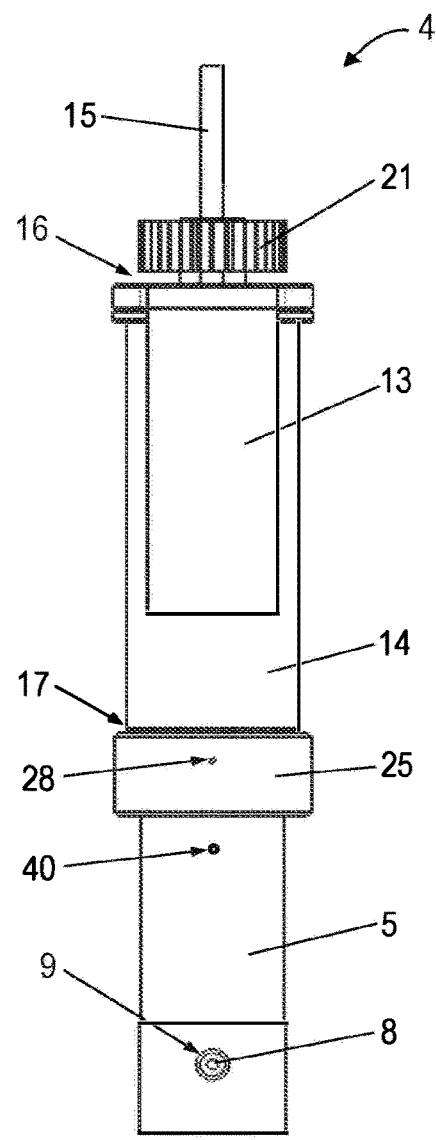
FIG. 3A
FIG. 3B
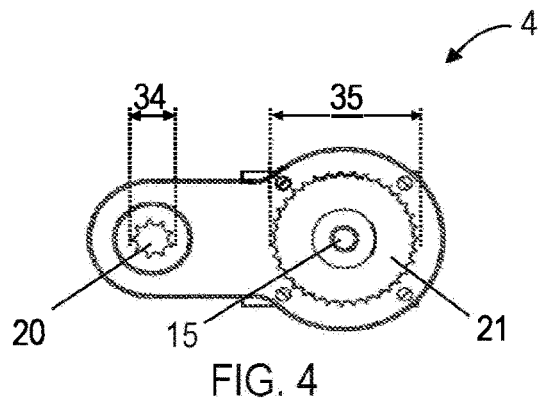
FIG. 4

SYSTEM FOR SUPPLYING HYDRAULIC PRESSURE TO A BOLT ELONGATION TOOL

The present application is a U.S. National Stage of International Application No. PCT/EP2017/051767, filed on Jan. 27, 2017, designating the United States and claiming priority of European Patent Application No. 16157082.5 filed with the European Patent Office on Feb. 24, 2016. All of the aforementioned applications are incorporated herein in their respective entireties by this reference.

The present invention is related to a system for supplying hydraulic pressure to a bolt elongation tool, comprising the bolt elongation tool with at least one pressure chamber and a tool piston, a hydraulic medium supply system and a hydraulic actuator with an actuator cylinder housing an actuator piston, wherein the actuator cylinder is attached to the at least one pressure chamber in a pressure-tight and liquid-tight manner in order to supply via the at least one pressure chamber the hydraulic pressure by means of a hydraulic medium to the tool piston.

Bolt connections are used throughout the world at the assembly of cars, machines, tools, in a workshop, at a manufacturing belt, or during the erection of steel structures, wind turbines, windmills, oil pipelines, towers used as antenna mast or look-out, or similar structures, assemblies or installations. In many of these cases, the bolt connections have to be tightened manually, and often this has to be done in places difficult or dangerous to access. In addition, an exceptional high level of quality of the related work processes is mandatory. As a consequence, the tightening of bolt connections is often critical in terms of, quality but also human health, related work time and costs.

In order to tighten bolt connections with a certain preload, one of the most common methods is to apply a tension to every bolt by torqueing. The downside of this method is a quite undefined amount of preload that is applied to the bolt due to a number of variances that are caused by friction between several counterparts as nut, bolt and washer. Another in terms of quality significantly better method is the stretching of the bolt by a physical elongation while a nut is tightened with a negligible predefined torque. The big benefit of this method is that the preload of the bolt can be adjusted directly in the tool. The before mentioned issues on uncertainty due to friction are not applicable in this method. These benefits are also highlighted in relevant guidelines as for example the VDI 2230. Corresponding bolt stretching tools often use hydraulic pressure in order to elongate the bolts. This hydraulic pressure is usually supplied by an external hydraulic system, which needs to be connected to the bolt stretching tool with lines or hoses.

DE 10 2005 015 922 A1 discloses a system to elongate a bolt, which system comprises an external hydraulic pump for supplying a pressurized medium. The hydraulic pump is connected to a bolt elongation tool via a line or hose in order to supply pressure to a piston inside a tool cylinder.

This known system has the disadvantage that the pressure generated at the external hydraulic pump is more than 1000 MPa, which is needed in the disclosed system configuration in order to sufficiently elongate a bolt. These hydraulic systems are bulky and are connected to an elongation tool via inflexible hoses that can hold the high hydraulic pressure. If a problem occurs, for example if the connection accidentally disconnects, start to leak or the hose breaks, which may likely happen at such high pressures, severe accidents are possible, especially since such tools are mainly operated manually. In addition, such external hydraulic pumps are often oversized, not only regarding the generated pressure, but also regarding their physical dimensions and their weight, making them unsuitable for the tightening of bolt connections at the erection of wind turbines, windmills, oil pipelines, towers used as antenna mast or look-out, or similar structures. The implementation of such a hydraulic pressure generator into or onto the tool is more or less impossible, since those high pressure hydraulic systems are standardised pressure generators that not specifically adapted for this application. Another disadvantage is that these hydraulic systems are usually built for much higher hydraulic flow rates which are not needed for the elongation of bolts.

It is an objective of the presented invention to provide a compact hydraulic pressure system that avoids the drawbacks of the known system and that applies tailored hydraulic pressure at a high level of quality in order to elongate and tighten a bolt in a predictable, well defined and secure way.

This objective is achieved with a system wherein the hydraulic actuator is an electro-hydraulic actuator comprising an electric motor built to generate the power of the electro-hydraulic actuator, and wherein the actuator piston is built to supply, with one stroke of an actuator stroke height of the actuator piston, at least the amount of hydraulic pressure that is needed to move the tool piston for the amount of one tool stroke height of the tool piston.

The system according to the invention advantageously enables to supply hydraulic pressure to a bolt elongation tool with an easy to handle and compact electro-hydraulic actuator that with a single stroke provides exactly the hydraulic pressure that is needed to physically elongate a bolt of a bolt connection to be tightened. Thereby, the quality of tightening of any kind of bolt connection is high and constant. In addition, the system is very safe, since it does not work with an unnecessary high pressure and does not contain connections and hoses that are unnecessarily long and/or vulnerable to failure. Due to its compactness and comparably low system weight, the system according to the invention can be used for bolt connections that are difficult or dangerous to access or that need to be tightened by a robot or a similar automated system. The compactness significantly simplifies the automation of such a robot system.

The system according to the invention enables a user to advantageously detach and in case again attach the actuator cylinder and the at least one pressure chamber to one another in order to supply, if attached to one another, via the actuator cylinder and the at least one pressure chamber, the amount of hydraulic pressure that is needed to move the tool piston for the amount of one tool stroke height of the tool piston. In this context, the hydraulic actuator and the bolt elongation tool can be detached and attached as often as desired or needed, wherein the function of the system, namely supplying the amount of hydraulic pressure that is needed to move the tool piston for the amount of one tool stroke height of the tool piston, is being maintained for the case that the hydraulic actuator and the bolt elongation tool are attached to one another in a pressure-tight and liquid-tight manner. Such a detachment or attachment, respectively, may happen, if a user wants to service, repair, or change a part of the hydraulic pressure system. In addition, the hydraulic actuator of the system may advantageously be used for more than just one bolt elongation tool, or the bolt elongation tool may advantageously be used in combination with various hydraulic actuators supplying various total amounts of hydraulic pressure.

In another embodiment of the invention the electro-hydraulic actuator could be integrated into the elongation tool, what enables to combine all in one unit. As a result no external hoses/connections with high pressure are needed what reduces the risk of accidents and increases the lifetime of the system.

In an advantageous embodiment of the invention, the hydraulic actuator can be detached or attached to the bolt elongation tool in a plug-and-play manner. In this context, the actuator cylinder of the hydraulic actuator can be directly attached to the at least one pressure chamber of the bolt elongation tool in a pressure-tight and liquid-tight manner by plugging an outlet of the actuator cylinder into at least one inlet of the at least one pressure chamber. Alternatively, an inlet of the at least one pressure chamber from the bolt elongation tool could be directly plugged into an outlet of the actuator cylinder. Vice versa, the actuator cylinder of the hydraulic actuator can be detached from the at least one pressure chamber of the bolt elongation tool by pulling out the outlet of the actuator cylinder from the at least one inlet of the at least one pressure chamber. Alternatively, the bolt elongation tool could be detached from to the actuator cylinder by pulling out the inlet of the at least one pressure chamber from the outlet of the actuator cylinder.

In a very advantageous embodiment of the invention, at least one of the at least one pressure chamber and the actuator cylinder comprise a security valve (SV). Thus, if these components are detached from one another, for example during service or maintenance, each security valve prevents a possible leakage of residual hydraulic medium, which for example remained inside the actuator cylinder or the at least one pressure chamber.

In a further advantageous embodiment of the invention, the system comprises connection means in the form factor of a short stiff hollow element connecting the actuator cylinder at an outlet with at least one inlet of the at least one pressure chamber, which connection means are built to enable the actuator cylinder and the at least one pressure chamber to be detachable and, preferably pluggable, attachable to one another in order to supply, if attached to one another, via the actuator cylinder and the at least one pressure chamber, the amount of hydraulic pressure that is needed to move the tool piston for the amount of one tool stroke height of the tool piston. Thus, the function-maintaining plug-and-play attachment or detachment procedures explained above can be performed with the help of the connection means. In addition, the connection means can advantageously act as a coupling or a distributor. The short stiff hollow form factor of the connection means enables that the actuator piston is mechanically fixed close to the bolt elongation tool and forms one mechanical unit what increases the compactness and safety.

Advantageously, also the connection means comprise at least one security valve, very advantageously one at every connection interface. Thus, if the pressure chamber and the actuator cylinder are detached from one another at or with the connection means, respectively, each security valve prevents a possible leakage of the hydraulic medium.

In an advantageous embodiment of the system, the hydraulic actuator is an electro-hydraulic actuator driven by an electric motor. If the electro-hydraulic actuator comprises a spindle housed in a spindle housing, which is connected to the actuator cylinder at a second end of the spindle housing, wherein the electric motor is axially connected to the spindle at a first end of the spindle housing, the electric motor can rotate the spindle. The electro-hydraulic actuator can be powered, for example, by a battery. Thus, the electro-hydraulic actuator is realized as a compact, handy and mobile tool that can be advantageously carried in a tool box or a similar container.

In a very advantageous embodiment of the system, the spindle housing further houses a spindle nut axially connected to the spindle. Thus, the electric motor can rotate the spindle nut in order to move the spindle substantially linearly along an axial direction of the electro-hydraulic actuator. If, moreover, the electric motor rotates the spindle nut via a toothed belt pulley that is wrapped around a first gear wheel rotated by the electric motor and around a second gear wheel axially connected to the spindle nut, wherein the diameter of the second gear wheel is larger than the diameter of the first gear wheel, the linear movement of the spindle can be advantageously controlled in a very accurate way.

Advantageously, the spindle is connected to the actuator piston via a spindle slider engaging into guiding grooves formed at the inside of the spindle housing, wherein the guiding grooves run substantially linearly along the axial direction, and wherein the spindle nut is built to move the spindle and the spindle slider along this axial direction. Thus, rotation of the spindle and the spindle slider is prevented.

In a further advantageous embodiment of the invention, the spindle housing at its second end can be connected to the actuator cylinder via a piston housing built to guide the actuator piston, which is sealed at the interface to the piston housing with a dynamic sealing. This allows to guide the actuator piston along a substantially linear movement along the axial direction of the electro-hydraulic actuator. At the same time it enables to liquid- and pressure-tightly separate the piston housing from the actuator cylinder, which eases possible service or repair works and improves the reliability of the system.

In a very advantageous embodiment of the invention, the piston housing may comprise a bleed gate built to bleed the actuator cylinder, in case that the actuator piston is retracted towards the dynamic sealing.

In an advantageous embodiment of the system, the at least one pressure chamber is built to supply hydraulic pressure by means of the hydraulic medium to a tool piston. The tool piston may have at least one of a diameter that is larger than the diameter of an actuator piston and a tool stroke height that is smaller than the actuator stroke height of the actuator piston. Thus, the hydraulic pressure generated by one stroke of the actuator piston in the actuator cylinder can be maintained in the bolt elongation tool, and the tool stroke height of the tool piston, which advantageously is much smaller than the actuator stroke height of the actuator piston, can be controlled in a very accurate way and generate high forces. This is especially important for bolt elongation tools, where the tool stroke height of the tool piston needs to be controlled very accurately in order to control the physical elongation very accurately.

These and further advantageous embodiments of the invention will be explained based on the following description and the accompanying drawings. The person skilled in the art will understand that various embodiments may be combined.

FIG. 1 shows in a cross section a system according to a first embodiment of the invention, wherein an actuator piston is in an injected state.

FIG. 1a discloses engagement of a tool with a bolt, and a relationship of the elongation of the bolt to a position of an actuator piston.

FIG. 3A shows in a side view an electro-hydraulic actuator from FIG. 1.

FIG. 3B shows in a front view the electro-hydraulic actuator from FIG. 1.

FIG. 4 shows in a top view the electro-hydraulic actuator from FIG. 1.

Figure 1:
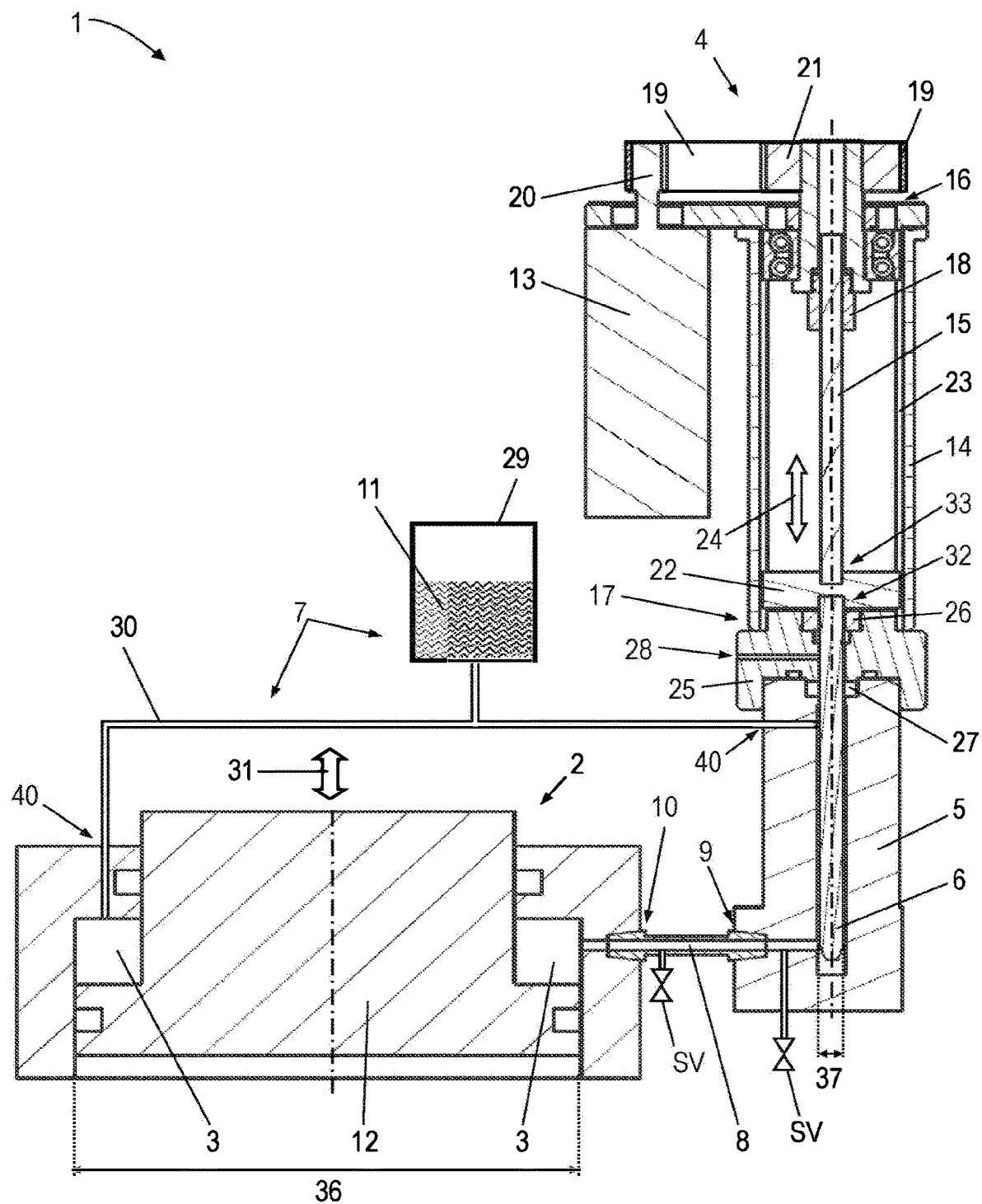
Figure 2:
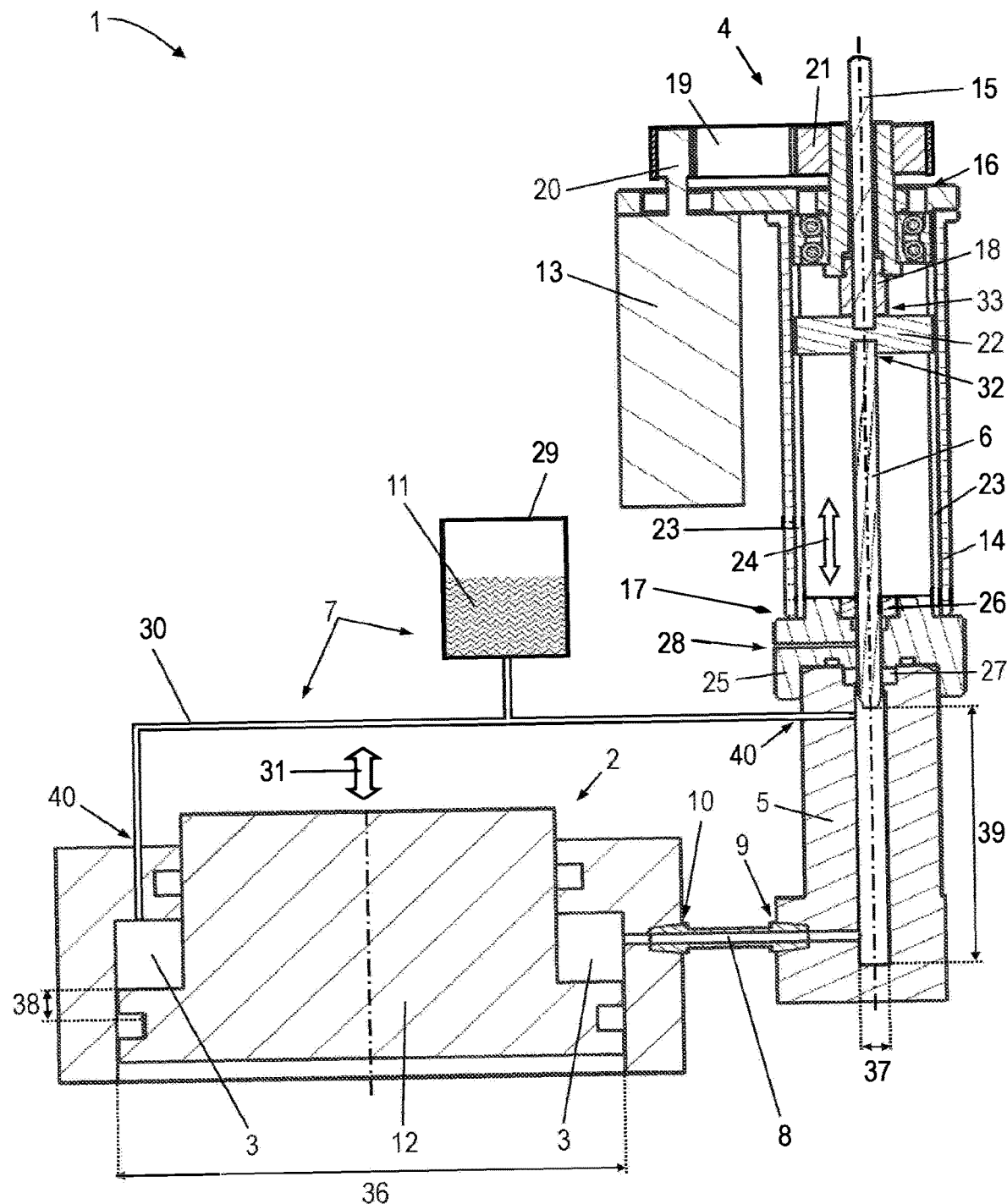
FIG. 2 shows in a cross section the system from FIG. 1, wherein the actuator piston is in a retracted state.
Figure 5:
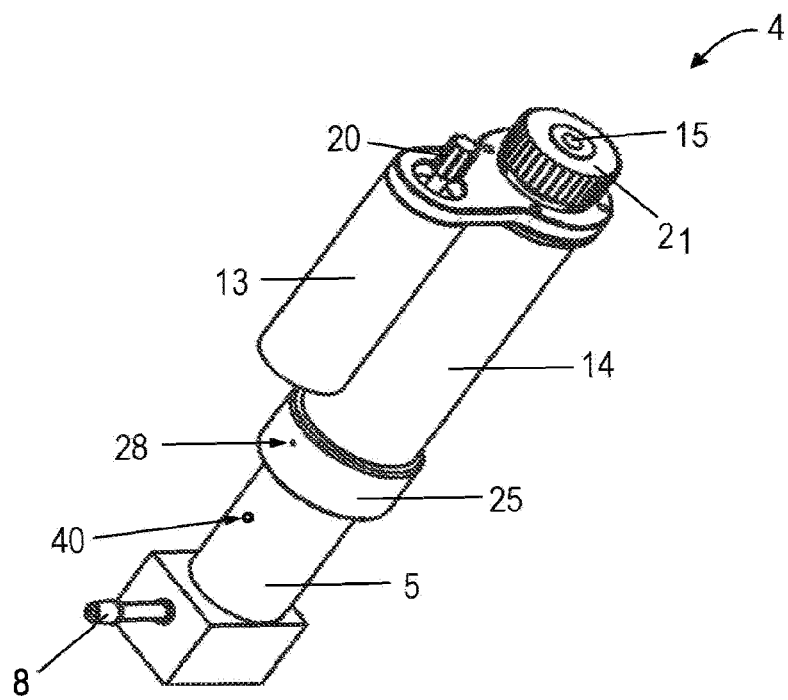
FIG. 5 shows in a perspective view from above the electro-hydraulic actuator from FIG. 1.

FIGS. 1 and 2 show a system 1 for supplying hydraulic pressure to a bolt elongation tool 2 according to a first embodiment of the invention. The system 1 comprises the bolt elongation tool 2 with a pressure chamber 3, an electro-hydraulic actuator 4 with an actuator cylinder 5, and a hydraulic medium supply system 7 supplying a hydraulic medium 11 to the system 1. Connection means 8 connect the actuator cylinder 5 at an outlet 9 with an inlet 10 of the pressure chamber 3. The connection means 8 are in the form factor of a short stiff hollow element, namely a tube which mechanically holds and connects the bolt elongation tool 2 and electro-hydraulic actuator 4 close together as one mechanical unit what increases the compactness and security.

Figure 1A:
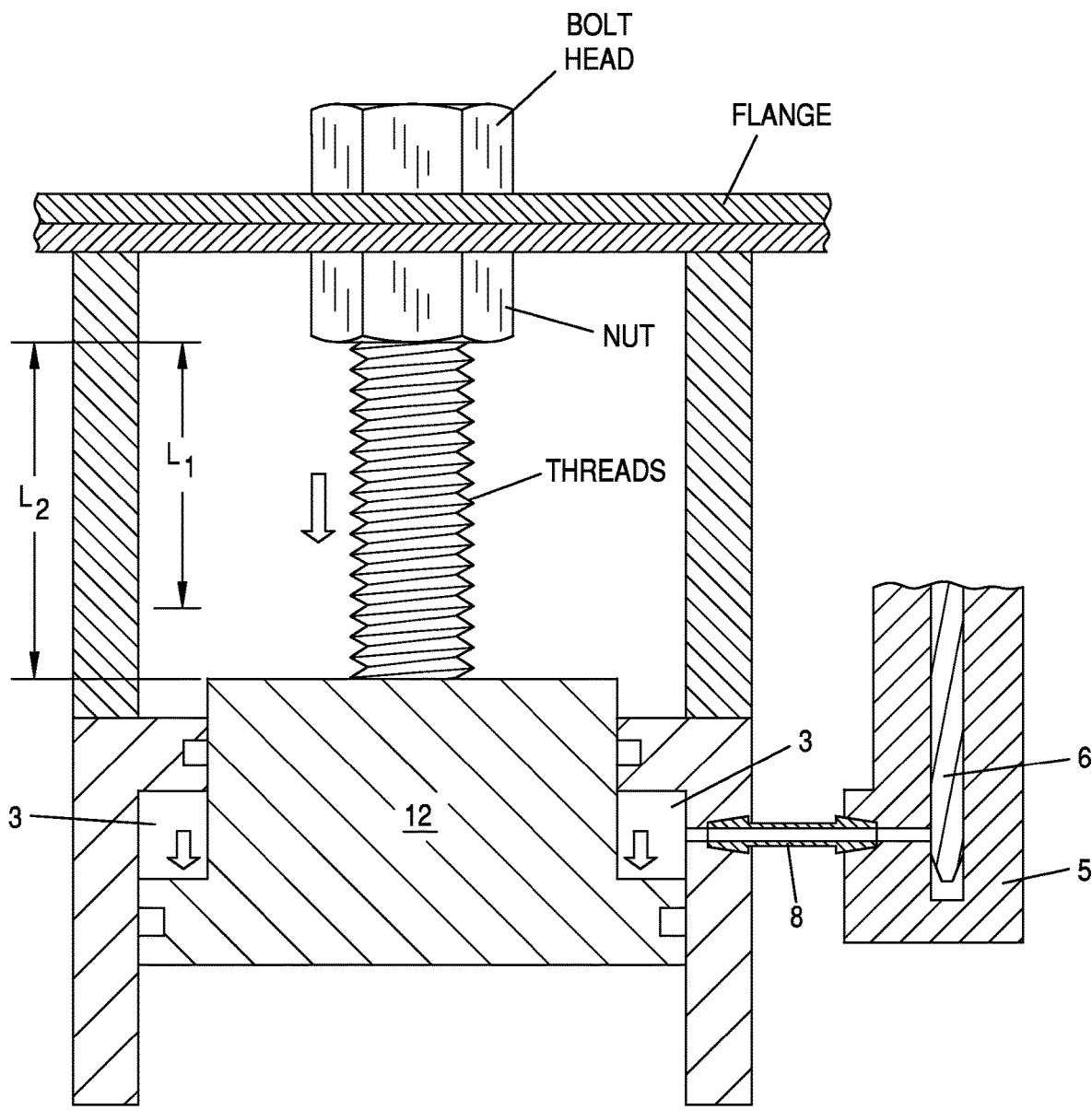

The actuator cylinder 5 of the electro-hydraulic actuator 4, which is also shown in FIGS. 3A to 5, houses an actuator piston 6. This actuator piston 6 is moved substantially linearly along an axial direction 24 of the electro-hydraulic actuator 4 from a retracted state, shown in FIG. 2, into an injected state, shown in FIG. 1, or vice versa. For example, as shown in FIG. 1a, movement of the actuator piston 6 to an extended state within the actuator cylinder 5 induces a pressure change in the pressure chamber 3 and the pressure change, in turn, causes a corresponding movement of the tool 12 (downward in FIG. 1a) which, by virtue of its engagement with a bolt that passes through a pair of flanges, acts to elongate the bolt. In FIG. 1a, the difference between $L_1$ and $L_2$ represents an extent to which the bolt has been elongated. The power of the electro-hydraulic actuator 4 is delivered by an electric motor 13. This electric motor 13 rotates a first gear wheel 20, which rotation is transferred by a toothed belt 19 to a second gear wheel 21, wherein the toothed belt pulley 19 is wrapped around the first gear wheel 20 and the second gear wheel 21, respectively. The second gear wheel 21 is axially connected to a spindle nut 18 at a first end 16 of a spindle housing 14, wherein the spindle nut 18 is housed by the spindle housing 14. The spindle housing 14 also houses a spindle 15 axially connected to the spindle nut 18.

At a second end 17, the spindle housing 14 is connected to the actuator cylinder 5 via a piston housing 25 built to guide the actuator piston 6. The actuator piston 6 penetrates the piston housing 25 with its first end 32 and is sealed at the spindle housing 14—piston housing 25 interface by means of an O-ring 26 and at the piston housing 25—actuator cylinder 5 interface by means of a dynamic sealing 27. Those skilled in the art will be aware of the fact that other known sealing means may be used. The piston housing 25 comprises a bleed gate 28 built to bleed the space surrounding the actuator piston 6, in case that the actuator piston 6 is retracted towards the dynamic sealing 27. The spindle 15 at its second end 33 and the actuator piston 6 at its first end 23 are connected by means of a spindle slider 22. The spindle slider 22 engages into guiding grooves 23 formed at the inside of the spindle housing 14. The guiding grooves 23 run substantially linearly along the axial direction 24.

When the electric motor 13 rotates the spindle nut 18, the spindle 15 and the spindle slider 22 are moved from the injected state into the retracted state, or vice versa, substantially linearly along the axial direction 24. Since the spindle slider 22 engages into the guiding grooves 23, a rotation of the spindle 15 and the spindle slider 22 is prevented. A diameter 35 of the second gear wheel 21 rotating the spindle nut 18 is larger than a diameter 34 of the first gear wheel 20 rotated by the motor 13. Thus, the gear transmission is big, which allows to control the substantially linear movement of the spindle 15 and the spindle slider 22 in a very accurate way. As a consequence, the generation of the hydraulic pressure can be controlled in a very accurate way, which accuracy is only limited to the accuracy of the measurement of the hydraulic pressure. The ratio of the diameter 35 of the second gear wheel 21 to the diameter 34 of the first gear wheel 20 depends on the bolt elongation tool 2 and how accurately the pressure fine-tuning is desired or needed. By changing the diameters 34 and 35 of the gear wheels 20 and 21, this ratio can be adapted.

The power generated by the motor 13 is transferred into the linear movement of the actuator piston 6, and thereby this power is transferred by the hydraulic medium 11 from the actuator cylinder 5 via the connection means 8 to the pressure chamber 3 of the bolt elongation tool 2. As soon as the pressure in the pressure chamber 3 rises, the power is transferred to a tool piston 12. As a consequence, the tool piston 12 is moved substantially linearly along a tool piston direction 31. The motor 13 can be powered by a battery. Thus, the electro-hydraulic actuator 4 is realized as a compact, handy and mobile tool that allows to supply a high force to the tool piston 12 with the comparatively low force, or power, of the battery.

In the electro-hydraulic actuator 4 according to the invention, there are no orifices, valves or possible occurrences of abrupt pressure drops. Therefore, the only heat contributors are flow and compression of the hydraulic medium 11 and the friction in and at the sealing, for example at the dynamic sealing 27. Therefore, additional cooling of the electro-hydraulic actuator 4 or the system 1 is not necessary. Due to the design according to the invention of the actuator cylinder 5 and the actuator piston 6, there is no leakage of hydraulic medium 11 in and at these components, and the amount of the hydraulic pressure transferred to the bolt elongation tool 2 can be fine-tuned very accurately, for example by a programmable logic controller (PLC).

Since the tool piston 12 has a diameter 36 that is much larger than the diameter 37 of the actuator piston 6, the actuator stroke height 39 of the actuator piston 6 is much larger than the tool stroke height 38 of the tool piston 12, for example around ten times larger. Thus, a full actuator stroke height 39 of the actuator piston 6 results in a comparatively small tool stroke height 38 of the tool piston 12, which is sufficient to elongate a bolt for tightening with very high forces. As a consequence, the pressure inside the pressure chamber 3 as well as the resulting tool stroke height 38 of the tool piston 12 can be controlled very precisely.

In the present first embodiment of the invention, the connection means 8 are designed as a rigid tube with two male fittings that are respectively pushed into the outlet 9 of the actuator cylinder 5 and into the inlet 10 of the pressure chamber 3, thereby liquid- and pressure-tightly connecting the actuator cylinder 5 with the pressure chamber 3 of the bolt elongation tool 2.

Similar connection means may also be an integral part of the electro-hydraulic actuator 4, more precisely of the actuator cylinder 5. In this case, an outlet of the actuator cylinder 5 would be directly plugged into an inlet of the pressure chamber 3, thereby entirely avoiding any hydraulic lines or hoses. The person skilled in the art will understand that similar connection means can be realized in many different ways.

The connection means 8, as well as the pressure chamber 3 and the actuator cylinder 5 may comprise a security valve. In case that the pressure chamber 3 and the actuator cylinder 5 are detached from one another at or with the connection means 8, each security valve prevents a possible leakage of the hydraulic medium 11. Thus, any component can be detached at any time. For example, after the actuator cylinder 5 was removed from the bolt elongation tool 2, the actuator cylinder 5 can be attached to another bolt elongation tool 2. Also, for example, another hydraulic or electro-hydraulic actuator with an actuator cylinder providing a higher or lower pressure may be attached to the bolt elongation tool 2.

Hereby, hydraulic medium 11 may be lost during the change of the electro-hydraulic actuator, such that the hydraulic medium supply system 7 may re-supply the system 1 with the hydraulic medium 11, for example from a reservoir 29. This reservoir 29 may also be added in case that a possible leakage of the hydraulic medium 11 needs to be compensated. The reservoir 29 is connected to the actuator cylinder 5 and the pressure chamber 3 at a gate 40, respectively. In addition, also the connection means 8 can be connected to the reservoir 29. This may be of special interest, in case that the connection means 8 additionally act as a coupling or distributor of the hydraulic medium 11.

Alternatively, only the bolt elongation tool 2 may be connected to the hydraulic medium supply system 7. In this case, the hydraulic medium 11 is supplied by the hydraulic medium supply system 7, possibly including the reservoir 29, via the pressure chamber 3 of the bolt elongation tool 2, if the electro-hydraulic actuator 4 is detached from the bolt elongation tool 2 and attached again, or if another hydraulic or electro-hydraulic actuator with an actuator cylinder providing a higher or lower pressure is attached to the bolt elongation tool 2.

Alternatively, only the electro-hydraulic actuator 4 may be connected to the hydraulic medium supply system 7. In this case, the hydraulic medium 11 is supplied by the hydraulic medium supply system 7, possibly including the reservoir 29, via the actuator cylinder 5 of the electro-hydraulic actuator 4, if the electro-hydraulic actuator 4 is detached from the bolt elongation tool 2 and attached again, or if another hydraulic or electro-hydraulic actuator with an actuator cylinder providing a higher or lower pressure is attached to the bolt elongation tool 2.

In all the above given examples, the hydraulic medium 11 may be supplied to all components of the system 1 by gravity, wherein the reservoir 29 is positioned correspondingly. If only the electro-hydraulic actuator 4 is connected to the hydraulic medium supply system 7, the hydraulic medium 11 may alternatively be supplied to all components of the system 1 by the actuator piston 6. In any case, pressure inside the system 1 can be built up (again), after hydraulic medium 11 was supplied to all connected lines and chambers. The actuator cylinder 5 may comprise the security valve in order to prevent a possible leakage of the hydraulic medium 11. In addition, the hydraulic medium 11 within the actuator cylinder 5 may be held by negative pressure during the exchange of the electro-hydraulic actuator 4, generated by retracting the actuator piston 6 an holding it in the retracted state.

In addition, the at least one pressure chamber 3, the actuator cylinder 5, and the connection means 8 may comprise an overpressure valve in order to prevent the system 1 from a too high pressure.

The connection means 8 may alternatively be made of a flexible material, and may comprise two female or one male and one female fitting. The connection means 8 may also comprise a threaded connection, or may be designed as a coupling, connecting different flanges with different diameters or fitting mechanisms. The connection means 8 may also be designed as a distributor of the hydraulic medium 11, connecting more than just one pressure chamber 3 or more than just one bolt elongation tool 2, wherein the connection means 8 may comprise a security valve at every of its' outlets. The connection means 8 may be made of at least one material, such as rubber, plastics, textiles, metal, fibre-reinforced plastics, or a combination thereof.

Figure 6:
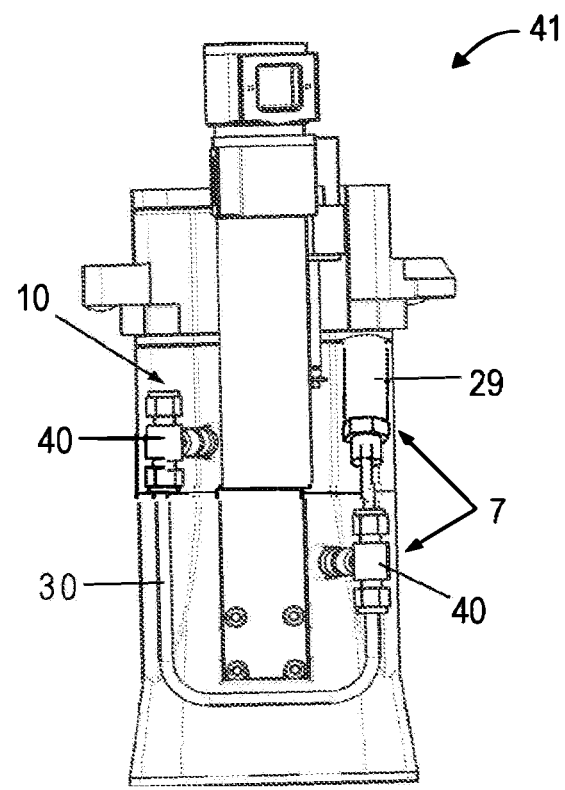
FIG. 6 shows in a front view a bolt elongation tool, comprising a hydraulic medium supply system, according to a second embodiment of the invention.

The hydraulic medium supply system 7 may comprise additional reservoirs for the hydraulic medium 11, for example for every part of the system 1. In addition, the hydraulic medium supply system 7 may supply hydraulic medium 11 to more than just one pressure chamber 3 of a bolt elongation tool. The hydraulic medium supply system 7 may be an integral part of the electro-hydraulic actuator 4 or of the bolt elongation tool 2, as shown in FIG. 6 for the example of a bolt elongation tool, or of any other possible part of the system 1. The lines 30 of the hydraulic medium supply system 7 may be made of a flexible or rigid material, such as rubber, plastics, textiles, metal, fibre-reinforced plastics, or a combination thereof. Connections or fittings between the lines 30 may be made of at least one of the previous mentioned materials, and having a push-in, barbed, threaded, or click-in connection or fitting mechanism.

In case that the hydraulic medium supply system 7 is an integral part of a component of the system 1, such as the electro-hydraulic actuator 4, no lines 30 may be necessary at all, or similar lines and a reservoir 29 may be an integral part of the housing of the component. In this case, especially if the electro-hydraulic actuator 4 comprises a security valve, the electro-hydraulic actuator 4 can be detached and attached to the bolt elongation tool 2 respectively, with or without the use of connection means 8, as often as desired or needed, wherein the function of the system 1, namely supplying with at least one stroke of the actuator stroke height 39 of the actuator piston 6 at least the amount of hydraulic pressure that is needed to move the tool piston 12 for the amount of one tool stroke height 38 of the tool piston 12, is being maintained.

In a second embodiment of the invention, as shown in FIG. 6, the system 1 comprises a bolt elongation tool 41. The bolt elongation tool 41 comprises a hydraulic medium supply system 7 with a reservoir 29 for a hydraulic medium 11. The bolt elongation tool 41 comprises two pressure chambers, which are not visible in FIG. 6, wherein each pressure chamber is provided with the hydraulic medium 11 through a gate 40. The electro-hydraulic actuator 4 can be attached to the bolt elongation tool 41 at an inlet 10 directly, or via additional connection means 8.

The term "tighten" or "tightening" in the description should be understood to cover the meaning of the terms bolt down or torqueing or preload or pre-stress or screw down.

The system 1 according to the invention is especially well-suited for the tightening of bolts arranged in flange connections or circular flange connections, such as it is the case for wind turbines, windmills, oil pipelines, towers used as antenna mast or look-out, or similar structures. Such tightening procedures can be performed manually or automatically by a robot, wherein the system 1 or the electro-hydraulic actuator 4 according to the invention can be applied in any case.

The hydraulic actuator can be the electro-hydraulic actuator 4, driven by the electric motor 13, which may be powered by a battery, according to the first and the second embodiment of the invention. Moreover, the hydraulic actuator can be an electro-hydraulic actuator powered from the energy grid, connected via a cable and a plug. In addition, the hydraulic actuator may be powered by compressed air, or manually by a hand wheel or by a hand piston.

In general, the system 1 or the electro-hydraulic actuator 4 can be used in connection with any kind of industrial application and with any kind of pressure receiver, such as a hand-operated or automated bolt stretching tool, hydraulic press, hydraulic jack, pressure transducer, a pressure measurement cell, or a controlling device, such as a valve, especially in the case where hoses and external pumps are a major problem.

The invention claimed is:

1. System for supplying hydraulic pressure to a bolt elongation tool, comprising the bolt elongation tool with a pressure chamber and a tool piston, a hydraulic medium supply system including a reservoir that fluidly communicates directly with the pressure chamber by way of a gate in the bolt elongation tool, and a hydraulic actuator with an actuator cylinder housing an actuator piston,
   wherein the actuator cylinder is selectively connectible to the pressure chamber in a pressure-tight and liquid-tight manner in order to supply via the pressure chamber the hydraulic pressure by a hydraulic medium to the tool piston,
   wherein the hydraulic actuator is an electro-hydraulic actuator comprising an electric motor operable to generate the power of the electro-hydraulic actuator and that the actuator piston is built to supply, with one stroke of an actuator stroke height of the actuator piston, at least a volume that is needed to move the tool piston for an amount of one tool stroke height of the tool piston, and
   wherein the actuator cylinder is configured so that when the actuator piston is in a fully extended state, the actuator piston prevents fluid communication between the actuator cylinder and the reservoir, and the actuator piston prevents fluid communication between the actuator cylinder and the pressure chamber, so as to maintain hydraulic pressure in the pressure chamber.

2. System according to claim 1, wherein the actuator cylinder and the pressure chamber are detachable from, and attachable to, one another in order to supply, via the actuator cylinder and the pressure chamber, the amount of hydraulic pressure that is needed to move the tool piston for the amount of one tool stroke height of the tool piston.

3. System according to claim 1, wherein when the actuator piston is fully retracted, both the reservoir and the pressure chamber are in fluid communication with the actuator cylinder.

4. System according to claim 1, wherein the system comprises a short stiff hollow connector connecting the actuator cylinder at an outlet with at least one inlet of the pressure chamber, which connector enables the actuator cylinder and the pressure chamber to be detachable from and attachable to, one another in order to supply, via the actuator cylinder and the pressure chamber, the amount of hydraulic pressure that is needed to move the tool piston for the amount of one tool stroke height of the tool piston.

5. System according to claim 1, wherein the one tool stroke height of the tool piston is smaller than the actuator stroke height of the actuator piston.

6. System according to claim 1, wherein the electro-hydraulic actuator comprises a spindle housing, housing a spindle axially connected to a spindle nut, which spindle housing is connected to the actuator cylinder at a second end of the spindle housing, wherein the electric motor is axially connected to the spindle nut at a first end of the spindle housing and built to rotate the spindle nut in order to move the spindle substantially linearly along an axial direction of the electro-hydraulic actuator, and the spindle does not rotate as it moves along the axial direction.

7. System according to claim 6, wherein the electric motor is operable to rotate the spindle nut via a toothed belt wrapped around a first gear wheel, wherein the electric motor is operable to rotate the first gear wheel, and around a second gear wheel axially connected to the spindle nut, wherein a diameter of the second gear wheel is larger than a diameter of the first gear wheel.

8. System according to claim 6, wherein the spindle at a second end is connected to a first end of the actuator piston via a spindle slider engaging into guiding grooves formed at an inside of the spindle housing, wherein the guiding grooves run substantially linearly along the axial direction, and wherein the spindle nut is built to move the spindle and the spindle slider along the axial direction.

9. System according to claim 6, wherein the spindle housing at its second end is connected to the actuator cylinder via a piston housing with a bleed gate operable to bleed the space surrounding the actuator piston, wherein the piston housing is operable to guide the actuator piston, which is sealed at the interface to the piston housing with a dynamic sealing.

10. System according to claim 1, further comprising a spindle housing, that houses a spindle axially connected to a spindle nut, wherein the electric motor is operable to rotate the spindle nut in order to move the spindle along an axial direction, and wherein the spindle at a second end is connected to a first end of the actuator piston, via a spindle slider engaging into guiding grooves formed at an inside of the spindle housing and running substantially linearly along the axial direction of the electro-hydraulic actuator.

11. Electro-hydraulic actuator according to claim 10, wherein the electro-hydraulic actuator is attachable and detachable to the bolt elongation tool in order to supply the amount of hydraulic pressure that is needed to move the tool piston for the amount of one tool stroke height of the tool piston.

12. Electro-hydraulic actuator according to claim 10, wherein the electro-hydraulic actuator at an outlet of the actuator cylinder comprises a short stiff hollow connector operable to enable the electro-hydraulic actuator being attachable or detachable to the bolt elongation tool in order to supply the amount of hydraulic pressure that is needed to move the tool piston for the amount of one tool stroke height of the tool piston.

13. Electro-hydraulic actuator according to claim 10, wherein the actuator cylinder or a connector comprise at least one security valve built to prevent leakage of the hydraulic medium.

14. Electro-hydraulic actuator according to claim 10, wherein the electric motor is operable to rotate the spindle nut via a toothed belt wrapped around a first gear wheel, wherein the electric motor is operable to rotate the first gear wheel, and around a second gear wheel axially connected to the spindle nut, wherein a diameter of the second gear wheel is larger than a diameter of the first gear wheel.

15. Electro-hydraulic actuator according to claim 10, wherein the electro-hydraulic actuator is sized and configured to be manually held.

16. System as recited in claim 1, wherein when the bolt elongation tool is engaged with a bolt, movement of the actuator piston to the fully extended position causes the bolt to elongate.

17. System for supplying hydraulic pressure to a bolt elongation tool, comprising the bolt elongation tool with a pressure chamber and a tool piston, a hydraulic medium supply system including a reservoir that fluidly communicates directly with the pressure chamber, and a hydraulic actuator with an actuator cylinder housing an actuator piston,
   wherein the actuator cylinder is connected to the pressure chamber in a pressure-tight and liquid-tight manner in order to supply via the pressure chamber the hydraulic pressure by a hydraulic medium to the tool piston,
   wherein the hydraulic actuator is an electro-hydraulic actuator comprising an electric motor operable to generate the power of the electro-hydraulic actuator and that the actuator piston is built to supply, with one stroke of an actuator stroke height of the actuator piston, at least a volume of the hydraulic medium that is needed to move the tool piston for an amount of one tool stroke height of the tool piston,
   wherein the system is configured to supply a pressure of at least 1000 MPa, and
   wherein the actuator cylinder includes a first fluid connection and a second fluid connection, and:
   when the actuator piston is in a fully retracted state, the actuator cylinder is connected to the reservoir by the first fluid connection, and actuator cylinder is connected to the pressure chamber by the second fluid connection; and
   when the actuator piston is in a fully extended state, both the first fluid connection and the second fluid connection are blocked by the actuator piston so as to maintain hydraulic pressure in the pressure chamber.

18. A system, comprising:
   a bolt elongation tool including a pressure chamber and a tool piston, the pressure chamber configured to supply a pressurized hydraulic medium to a surface of the tool piston, and the bolt elongation tool configured to releasably engage a bolt;
   a hydraulic system including a reservoir configured for fluid communication with the pressure chamber, and for fluid communication with an actuator cylinder within which is received an actuator piston;
   a motor at least indirectly connected to the actuator piston, and the motor is operable to move the actuator piston within the actuator cylinder, and
   wherein the actuator cylinder is configured so that when the actuator piston is in a fully extended state: the actuator piston prevents fluid communication between the actuator cylinder and the reservoir; and the actuator piston prevents fluid communication between the actuator cylinder and the pressure chamber.

19. The system as recited in claim 18, wherein when the actuator piston is in the fully extended state, the actuator piston maintains hydraulic pressure in the pressure chamber.

20. The system as recited in claim 18, wherein when the bolt elongation tool is engaged with the bolt, movement of the actuator piston to the fully extended position causes a corresponding movement of the tool piston to elongate the bolt.

* * * * *